J. R. MEYERS.
PROCESS OF CHEESE PACKING.
APPLICATION FILED APR. 21, 1921.
1,415,944. Patented May 16, 1922.
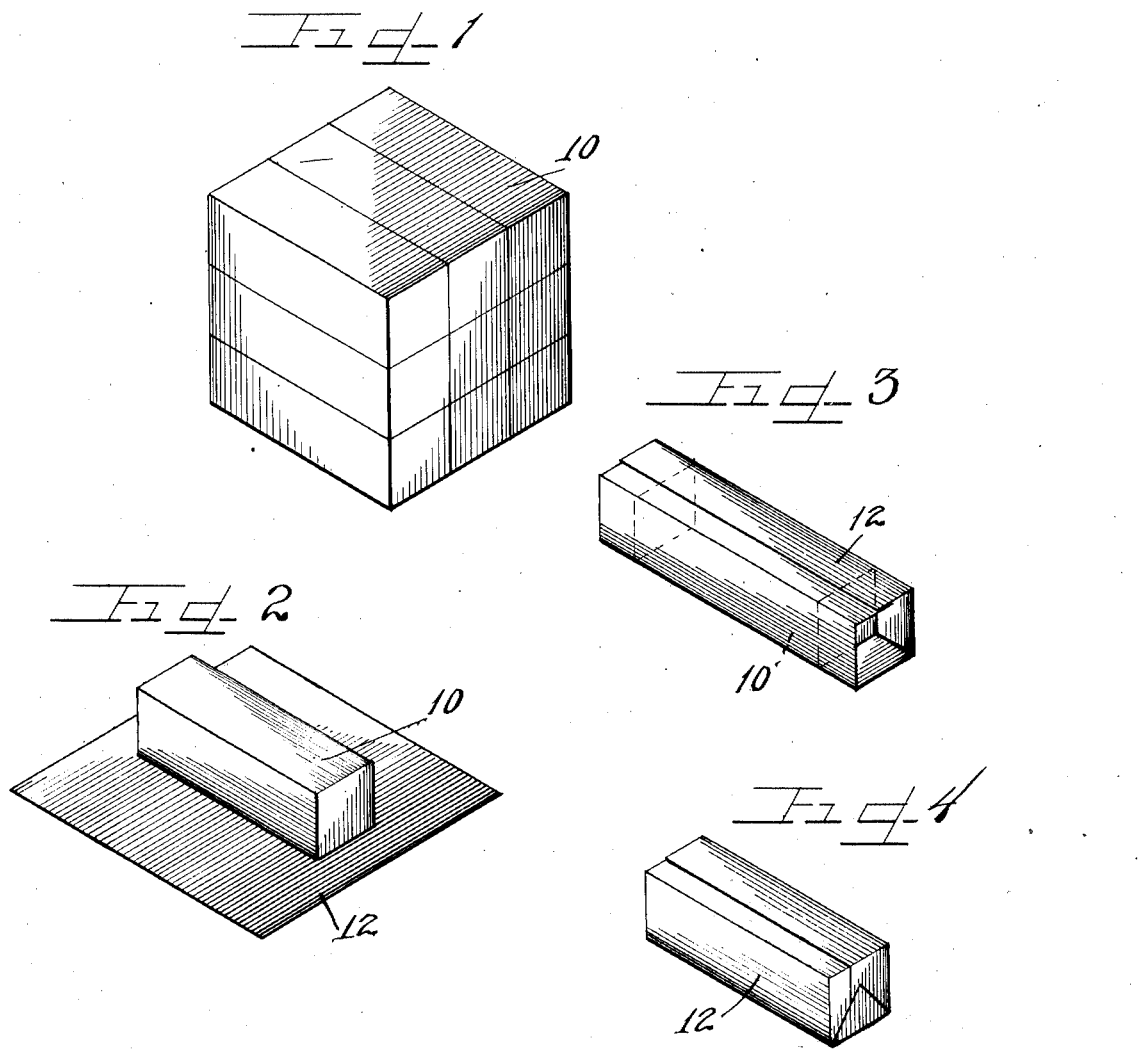

UNITED STATES PATENT OFFICE.

JULIUS R. MEYERS, OF EVANSTON, ILLINOIS.

PROCESS OF CHEESE PACKING.

1,415,944.  Specification of Letters Patent.  Patented May 16, 1922.

Application filed April 21, 1921. Serial No. 463,166.

*To all whom it may concern:*

Be it known, that I, JULIUS R. MEYERS, a citizen of the United States, and a resident of the city of Evanston, in the county of Cook and State of Illinois, have invented certain new and useful Improvements in a Process of Cheese Packing; and I do hereby declare that the following is a full, clear, and exact description of the same, reference being had to the accompanying drawings, and to the numerals of reference marked thereon, which form a part of this specification.

This invention relates to an improved process and method of packing cheese and is particularly adapted for use in preparing for the market small blocks of cheese in individual sizes or blocks ranging in weight from one to ten pounds which may be sold direct to the consumer without any cutting or subdividing.

Heretofore in making individual blocks of cheese for sale upon the market, it has been the custom to initially place curds within a large press or mold and then for a period of from eight to twelve hours gradually or from time to time increase the pressure thereof to press out the whey and thereby form a large green cheese. This green cheese is then removed from the press or mold and cut into a plurality of pieces to form small blocks. These small blocks of cheese are then placed in smaller molds and again pressed in order to properly form them. Afterwards the curing process is completed. It will be obvious that by this process a rind is formed around each of the individual blocks, thus causing considerable waste in the cheese block.

I am aware that wrapping cheese in covers of tin foil is old and well known, but these wrappers as heretofore applied were not bonded or united with the outer surfaces of the cheese, and were therefore easily liable to become loose or broken away while handling.

Furthermore, where such a cheese is cut, the tin foil is usually torn away, sometimes larger portions of it adhering more to one of the severed pieces than to others, with the result that surfaces of the cheese were exposed and dried out, with consequent deterioration. This tearing of the foil is entirely avoided in my process, a clean cut of the foil and the cheese being positively insured.

One of the objects of this invention is the provision of a process of cheese packing wherein individual blocks of cheese are packed with a protective coating of tin foil or the like which will act as a rind about the cheese preserving it and preventing shrinkage as well as protecting the same from dirt and the action of the air and which can be readily cut through or removed when the cheese is ready to be used leaving the cheese in a condition to be entirely consumed and without any of the waste or loss resulting from the usual rind.

Another object of this invention, therefor, is the provision of a method of packing cheese blocks which, after having been cut from a large green cheese, will be so packed and the cure then completed which will result in the formation of a completely cured small block of cheese without the undesirable rind thereupon, but which shall be sufficiently protected from the action of the air or other undesirable factors and which will hold the cheese moist so that it will not become hard.

A further object of this invention is the provision of a method for packing cheese which will provide a finished cheese having an outer covering of metal foil or the like thereon which shall be so incorporated or bonded with the body of the cheese itself that there will be no liability of its becoming loosened from the cheese until the same is ready to be used.

Still another object of this invention is the provision of a method of packing cheese blocks wherein a protective covering of fused casein is formed around the outside of a block of cheese which is prepared in such a manner that it is readily edible and agreeable to the taste.

Other and further important objects of this invention will be apparent from the disclosures in the accompanying drawings and following specification.

The invention (in a preferred form) is illustrated in the drawings and hereinafter more fully described.

On the drawings:

Figure 1 represents a large block of green cheese after it has been cut up into smaller blocks of the desired size.

Figure 2 shows one of the small blocks about to be enclosed in a covering of metal foil.

Figure 3 is a similar view showing the method of wrapping the block of cheese.

Figure 4 is a perspective view showing the block of cheese after having been wrapped in the foil.

As shown on the drawings:

The reference numeral 10 indicates a small block of the large mass of cheese illustrated in Figure 1. These blocks may be of any desired size according to the particular market upon which the blocks of cheese are to be placed, and they may range in size from one-half pound to five or ten pounds if desired.

As shown in Figure 2, the block of cheese 10 is placed upon a square of tin or other metal foil 12 in which it is adapted to be wrapped and which is cut to the desired size. Figures 3 and 4 show corresponding following steps in the process of wrapping the block of cheese 10 which may be wrapped in any other manner if found to be convenient or desirable.

The process is as follows:

The curd from which the cheese is made is put in a large mold making a large block as shown in Figure 1, and may be cured before cutting in smaller blocks or not as may be seen fit. This large block is then cut into smaller blocks 10 of uniform size and desired weight as shown in Figures 1 and 2. The small blocks are subsequently wrapped in squares of metal foil 12, preferably tinfoil of a uniform thickness and this foil is illustrated in Figure 4. The wrapped block is then pressed against hot plates or other heating surfaces, thus melting the casein at the surfaces of the cheese beneath the foil enough to cause the same to form a bond and attach itself to the metal foil and effectively seal the package.

It will be obvious, of course, that the hot plates may be either pressed onto the cheese, or the cheese may be passed over them at a suitable pressure. These hot plates may be heated by steam, electricity, or any other desirable method, so that the heat from the same will pass through the tin foil to act upon the casein of the cheese in such a manner as to slightly melt the same to form an outer seal around the cheese, which seal likewise coacts with the metal foil to form a bond between the cheese and the foil which acts to thoroughly protect the same from the outside atmosphere and foreign elements, thus providing a covering which, when removed, will leave a fresh, clean surface of cheese which may be consumed without waste. The blocks of cheese 10 may be cured before placing the tin foil thereon or afterwards, as desired, the incorporation of the tin foil having no effect upon the curing process.

It will be seen that herein is provided an article which, from the time it leaves the cheese manufacturer to the time it reaches the ultimate consumer, is positively covered and protected from the action of the atmosphere, as well as other outside elements and which, when ready to be used, will be found to be in a fresh, moist, clean condition, thereby making a very desirable product. Moreover, the process of fusing the casein at the outer surfaces of the cheese to the metal foil is adapted to securely retain the metal foil in position upon the block of cheese, so that there will be no liability of the same becoming loose during handling or shipment.

I am aware that changes may be made in the various details in the method of operation and the process of wrapping and securing the foil to the blocks of cheese without departing from the principles of this invention, and I therefore do not contemplate limiting the patent granted thereon otherwise than necessitated by the prior art.

I claim as my invention:

1. A process of protecting blocks of cheese consisting in wrapping the same with a metal foil which is afterwards bonded to the cheese by the application of heat.

2. The process of protecting blocks of cheese including wrapping the blocks in a covering of metal foil and subsequently applying heat through the foil so as to form a bond between the cheese and the foil.

3. A process of packing cheese which includes forming a large mass of cheese, cutting the same into individual blocks, wrapping these blocks with metal foil, and subsequently heating and bonding the metal foil with the outer surfaces of the cheese in such a manner as to form an air tight package.

4. An article of manufacture, a block of cheese covered with a protective coating of metal foil, the same having been incorporated into the outer surfaces of the cheese by fusion of the casein at the outer surfaces of the cheese effected by applying heat to the surfaces of the wrapped block.

5. An article of manufacture, a block of cheese wrapped in tin foil, the tin foil being attached and incorporated onto the cheese by means of fused casein.

In testimony whereof I have hereunto subscribed my name in the presence of two subscribing witnesses.

JULIUS R. MEYERS.

Witnesses:
  CHARLES W. HILLS, Jr.,
  CARLTON HILL.